Figure 1:
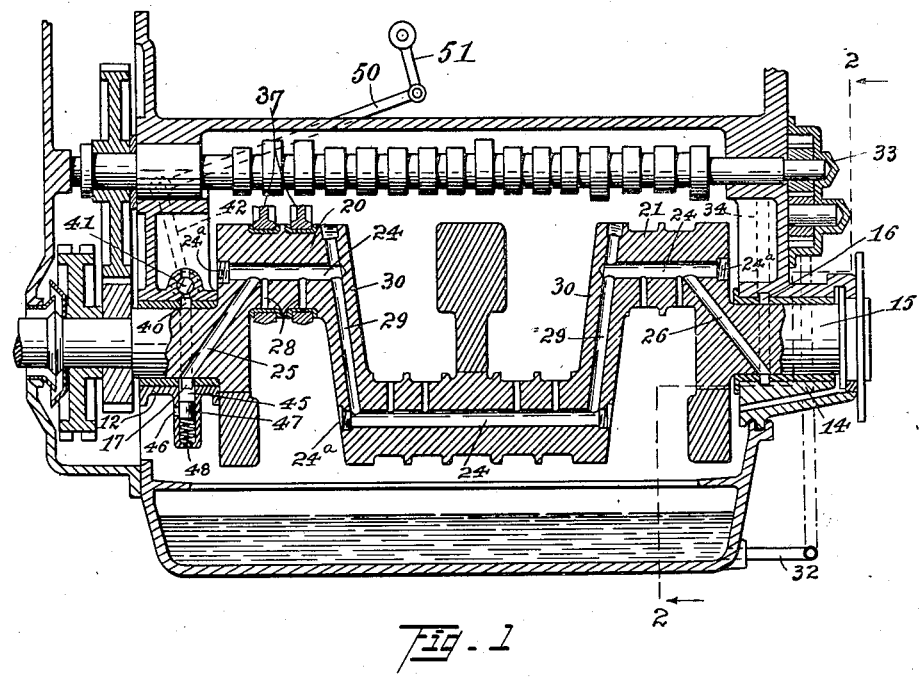

A. P. BRUSH.
LUBRICATING SYSTEM FOR INTERNAL COMBUSTION ENGINES.
APPLICATION FILED MAY 25, 1916.

1,230,461. Patented June 19, 1917.

TO PRESSURE GAUGE

Inventor
Alanson P. Brush
by Thurston Lewis
Attys.

UNITED STATES PATENT OFFICE.

ALANSON P. BRUSH, OF DETROIT, MICHIGAN.

LUBRICATING SYSTEM FOR INTERNAL-COMBUSTION ENGINES.

1,230,461. Specification of Letters Patent. Patented June 19, 1917.

Application filed May 25, 1916. Serial No. 99,775.

*To all whom it may concern:*

Be it known that I, ALANSON P. BRUSH, a citizen of the United States, residing at Detroit, in the county of Wayne and State of Michigan, have invented a certain new and useful Improvement in Lubricating Systems for Internal-Combustion Engines, of which the following is a full, clear, and exact description.

This invention relates to engines whose crank shafts have between their supporting bearings two or more crank pins which are engaged by connecting rods.

The object of this invention generally is to satisfactorily lubricate the bearing surfaces of the crank pins and the connecting rods thereon, and also the crank shaft bearings, in proportion to their needs; or to put the matter more definitely, to increase the oil delivered to said parts as the throttle valve is opened, and the engine, as a result, is either operating more rapidly or under a greater load.

The invention is shown in the drawing and hereinafter described and definitely pointed out in the appended claims.

Figure 2:
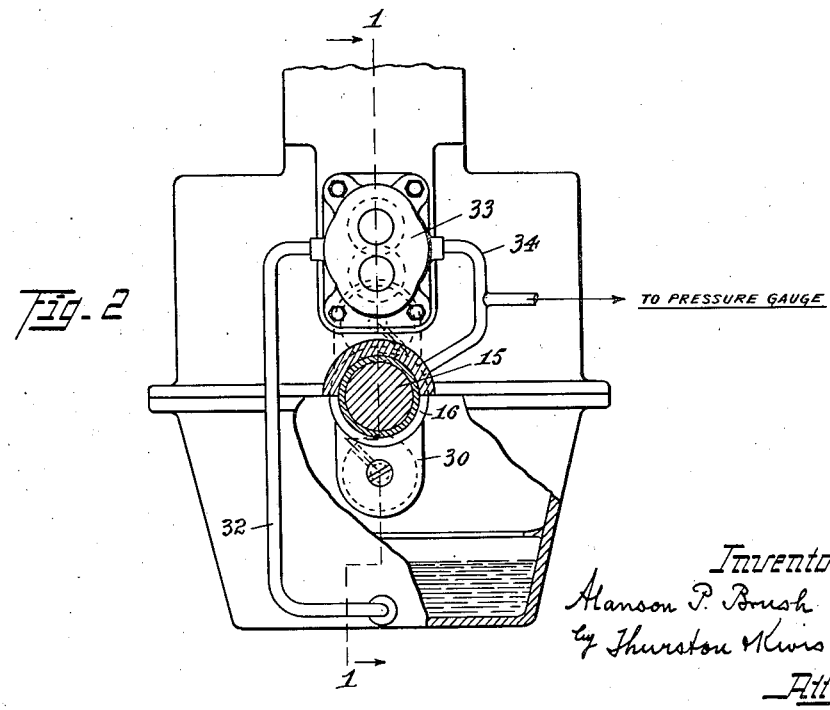

In the drawing, Figure 1 is a longitudinal central vertical section through the crank shaft and associated parts which constitute this invention; Fig. 2 is an end view partly sectioned of the right end of Fig. 1.

Referring to the parts by reference characters, 10 represents the crank case of an internal combustion motor; 12 and 14 the bearings carried thereby in which the crank shaft 15 is rotatably mounted. Between the supporting bearings the crank shaft has a plurality of crank pins. In the construction shown there are three crank pins. Two of these crank pins, 20 and 21, are each designed to receive two connecting rods 37, while the other and middle crank pin 22 is designed to receive four of such connecting rods. The specific crank shaft shown is therefore designed for an eight-cylinder engine; and more particularly an engine of the V-type, although the invention is not restricted to this type of engine or to a crank shaft having the particular number or kind of crank pins specified.

33 is an oil pump of any suitable construction, which draws oil from the crank case 10 through a pipe 32; and discharges its oil through a duct 34 into an annular oil pocket 16 in one of the crank shaft bearings 14.

From this oil pocket 16 the oil flows through a crooked conduit within the crank shaft; which conduit at its discharge end discharges into an annular oil pocket 17 in the bearing 12 at the front end of the crank shaft. The crank shaft oil conduit includes a longitudinal hole 24 in each of the crank pins, which holes are closed at their ends by plugs 24ª. Also this conduit includes an oil duct 26 in the crank shaft connecting the oil groove 16 with the adjacent hole 24. This conduit also includes an oil duct 25 extending diagonally in the crank shaft and communicating with the oil pocket 17, and with the hole 24 on the associated crank pin. This oil conduit also includes oil ducts 29 which are formed in the crank cheeks 30 and which connect, in series, the several holes 24 in the crank pins.

There is an oil delivery duct 28 formed through that part of each crank pin which serves as a bearing for a connecting rod,— said duct communicating at one end with the hole 24 and leading therefrom toward, not away from, the axis of the crank shaft. In the construction shown there are eight of these delivery ducts, because the crank pins are constructed to engage eight connecting rods.

It is not necessary or even preferable that the oil delivery ducts 28 shall discharge in a radial direction toward the axis of the crank shaft; but it is of great advantage that the discharge end of each duct shall be nearer the axis of the crank shaft than the oil hole 24 from which it leads. When the oil discharge ducts are so placed, there will be no discharge of oil therefrom as the result of centrifugal force generated by the rotation of the crank shaft. Preferably each oil delivery duct extends at an angle of 45° to a radial line drawn from the axis of the crank shaft to the axis of the associated crank pin, and behind said line,—that is to say, the duct is so inclined that as the shaft rotates (the direction of rotation being shown by the arrow under Fig. 2), the said oil hole 24 comes to a position vertically over or under the axis of the crank shaft before the outlet end of said duct comes to that position. The discharge end of each of these ducts is therefore at about the point on the crank pin where the pressure of the connecting rod thereon is greatest.

It is obvious that as the oil pump operates it will pump oil into the annular oil pocket 16, from which it flows into and through the crooked oil conduit in the crank shaft; and that the oil from this conduit will flow into the annular oil pocket 17. From this pocket there are two avenues of escape, as shown; one through an oil duct 40 in which an ordinary valve 41 is placed, which valve is provided with an operating handle 42. The other avenue of escape for this oil is through a tube 45 having through its side an outlet 46 which normally is covered by a plunger 47 that is held in this position by a spring 48.

The valve operating lever 42 is preferably connected by suitable means, as for example, a link 50, with the throttle lever 51 of the carbureter of the engine. Of course this lever 51 and the link 50 are rather diagrammatic, as disclosed in the drawing. These two levers 42 and 51 should be so constructed and connected that, when the lever 51 has been moved to the position such as substantially closes the throttle, the lever 42 will be moved to such position as will open the valve 41, and thus allow oil to escape freely from the oil pocket 17.

The oil pump 33 is of course to be driven from the engine by any of the means commonly employed for this purpose, and therefore the speed of the oil pump will be proportionate to the speed of the engine. The oil pump is of such capacity that when the engine is idling, that is, when the throttle valve is nearly closed and valve 41 is nearly open, the pump will discharge oil into the oil pocket 16 at a rate such that said oil may flow therefrom through the crooked oil conduit in the crank shaft and thence into the oil pocket 17 and out past the valve 41 without being thereby put under much pressure. The pressure should be merely sufficient to cause a very slight flow of oil from the oil discharge ducts 28, because, under such conditions, that is to say, when the engine is idling, the crank pins require very little lubrication. When, however, the speed of the engine is increased, or when the load of the engine is increased, one or both of which results are always incident to opening the throttle lever 51, the valve 41 will be closed in proportion to the opening of the throttle. Likewise the speed and consequent effect of the oil pump will be increased. Oil will, therefore, be forced more rapidly into the oil conduit of the crank shaft, and at the same time its escape will be proportionately impeded. The result will be that the oil in this crooked conduit will be put under pressure, and that this pressure will be more or less nearly proportioned to the opening of the throttle, which is but another way of saying that as the requirement for greater lubrication is increased, the pressure on the crooked oil conduit will likewise be increased, and therefore oil will be caused to flow with greater rapidity out through the oil ducts 28 onto the bearing surfaces between the crank pins and the connecting rods.

As the valve 41 is closed, and as the pressure of the oil in the crooked oil conduit is increased, the plunger valve 47 will be moved downward, thereby uncovering to a greater or less extent the oil discharge opening 46. The spring used to close this plunger should be graduated so that the required maximum pressure of oil in the conduit will be maintained when the throttle is wide open and when consequently the valve 41 is closed.

It should be remembered that in all crank shaft oiling systems, the oil has two functions to perform, viz: to cool as well as to lubricate the bearings. With the construction herein shown and described the pump delivers its full capacity of oil to the crooked oil conduit, and reaches every bearing on the crank shaft. Every one of these bearings is positively reached by the oil, even though no pressure is registered in the oil gage. When pressure is carried on the oil line the pressure is equal on every bearing except as modified by centrifugal effects and frictional flow within the oil line. The continuous flow of oil throughout the length of the crank shaft will maintain automatically the temperature of all crank shaft bearings closely approximate to that in the main body of the oil in the reservoir. The small amount of oil discharged from the oil conduit onto the crank pin bearings has no duty to perform except merely to lubricate them. Wherefore, the amount so discharged may be small when, as in the present case, the function of cooling the bearings is performed not by the oil discharged but by the oil which flows through the crooked conduit. Obviously, this result would not be accomplished in an efficient way if the oil discharged by the pump were by-passed before it was delivered into the crooked oil conduit passing through the crank shaft.

The specific means shown for controlling the rate at which oil can be discharged from the end of the crooked oil conduit described are obviously not essential, albeit they are thoroughly well adapted to secure the desired results in an effective manner. The invention broadly considered merely requires that there be means by which to control the delivery of oil from the oil conduit, and to thereby vary the pressure of oil in said conduit, and therefore the rate of delivery of oil onto the engaging surfaces of the crank pins and the connecting rods thereon.

Having described my invention, I claim:—

1. The combination of a crank shaft having a plurality of crank pins between the crank shaft bearings and having a continuous crooked oil conduit extending longitudinally through said crank shaft and through the several crank pins thereon,—there being oil delivery ducts leading from said conduit outward to the surfaces of the crank pins of said crank shaft, means for forcing oil into one end of said oil conduit, and means located adjacent the other end of said oil conduit for controlling the rate of discharge of said oil from said oil conduit.

2. The combination of a crank shaft having a plurality of crank pins between the crank shaft bearings and having a continuous crooked oil conduit extending longitudinally through said crank shaft and through the several crank pins thereof,—there being oil delivery ducts leading from said conduit outward to the surfaces of the several crank pins, means for forcing oil into one end of said conduit and causing it to flow through said conduit and out of the other end thereof, and manually operable means located adjacent the discharge end of said conduit to vary and regulate the pressure on the oil in said conduit.

3. The combination of a crank shaft having a plurality of crank pins between the crank shaft bearings and having a continuous crooked oil conduit extending longitudinally through said crank shaft and through the several crank pins thereof,—there being oil delivery ducts leading from said conduit outward to the surface of the several crank pins, means for forcing oil into one end of said conduit, and a valve at the other end of said conduit to permit and regulate the rate at which oil will be discharged therefrom.

4. The combination of a crank shaft having a plurality of crank pins between the crank shaft bearings and having a continuous crooked oil conduit extending longitudinally through said crank shaft and through the several crank pins thereof,—there being oil delivery ducts leading from said conduit outward to the surface of the several crank pins, an oil pump which is driven from said crank shaft and is adapted to discharge its entire output into one end of said conduit, and a valve at the other end of said conduit to permit and regulate the rate at which oil will be discharged therefrom.

5. In an internal combustion engine, the combination of a crank case provided with shaft bearings, a crank shaft mounted in said bearings and having a continuous crooked oil conduit extending longitudinally through it and through the several crank pins thereon there being oil delivery ducts leading from said conduit outward to the surfaces of the several crank pins of said crank shaft, means for forcing oil into one end of said conduit, a valve to permit and control the rate of discharge of oil from the other end of said conduit, the throttle lever of the engine, and means connecting said throttle lever with said valve and adapted to cause said valve to close as the throttle is open and vice versa.

6. The combination of a crank shaft, bearings therefor, said shaft having a plurality of crank pins between the crank shaft bearings and having a continuous crooked oil conduit extending longitudinally through said crank shaft and through the several crank pins thereon there being oil delivery ducts leading from said conduits outward to the surfaces of the several crank pins, means for forcing oil into one end of said conduit, a manually operable valve at the discharge end of said conduit to control the rate of flow of oil therefrom, a spring closed valve, and a valve casing therefor in communication with the discharge end of said conduit.

7. The combination of a crank case provided with crank shaft bearings, a crank shaft rotatably mounted in said bearing and having through it a crooked oil conduit which extends from one bearing to the other the ends of said conduit being at the surface of said crank shaft within both bearings, and has oil discharge ducts leading to the surfaces of the several crank pins,—there being an oil pocket in each bearing in open communication with the respective ends of said oil conduit, means for forcing oil into one of said oil pockets, and two valves one manually operable and one controlled by a spring to vary and regulate the rate at which oil may be discharged from the other oil pocket.

In testimony whereof, I hereunto affix my signature.

ALANSON P. BRUSH.